L. TOEGEL.
LINE REEL.
APPLICATION FILED MAY 27, 1912.
1,058,925.
Patented Apr. 15, 1913.
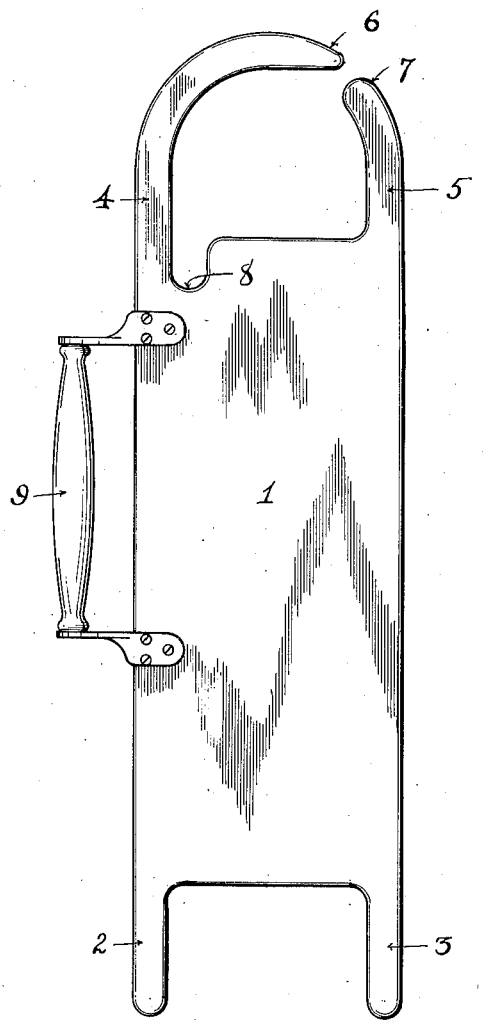

UNITED STATES PATENT OFFICE.

LUDOLF TOEGEL, OF BUFFALO, NEW YORK.

LINE-REEL.

1,058,925. Specification of Letters Patent. Patented Apr. 15, 1913.

Application filed May 27, 1912. Serial No. 700,057.

*To all whom it may concern:*

Be it known that I, LUDOLF TOEGEL, a citizen of the United States, residing at Buffalo, in the county of Erie and State of New York, have invented certain new and useful Improvements in Line-Reels.

My invention relates to reels, and more particularly to reels for holding lines, rope and the like.

The object of my invention is to provide a reel which is simple of construction, which will hold the line from unwinding of itself and which, at the same time, will permit winding and unwinding the line with ease and rapidity.

In the drawing herewith, which is an elevation, I have shown an embodiment of my invention which discloses its characteristics, but which, naturally, is capable of variation in size, detail of construction and matters of form and shape without departing from the spirit and intent of this specification or in limitation of the claim hereto appended.

The body 1 of the reel has the usual extensions 2 and 3 at one end to hold the line. At the opposite end are extensions 4 and 5. These are turned inwardly to form the converging ends 6 and 7, and the extension 4 is preferably longer than the extension 5, so that the opening between the ends 6 and 7 will be situated nearer the right hand side of the reel (or the side opposite the handle), for convenience in winding. A seat or notch 8 may be provided in which the line may be started, and a handle or grip 9 may be secured to, or made integral with, the body 1.

The converging ends 6 and 7 are rounded to permit the passage of the line in or out under slight pressure or strain—that is to say, the distance between the ends 6 and 7 should be slightly less than the diameter of the line to which it is adapted, but only sufficiently less to prevent the line from unwinding of itself.

When a line is wound on this improved reel, it is held in place against involuntary unwinding by the transverse inwardly extending outer portion of the longer extension 4 which projects across the winding path of the line and forms an exterior retaining arm or stop at one end of the wound line.

The reel may be made of wood or metal; and the handle 9 may be attached to the body 1 by ears, as shown, or, if the body is made of metal, it may be stamped out integral therewith.

My invention is of special utility as a household article for holding clothes-lines; as an article for artisans to hold chalk-lines, plumb-lines, etc.; and as an article for sportsmen for holding fish-lines. Other utilities are self-evident.

Having thus described my invention, I claim:—

A line reel comprising a body and holding extensions at the opposite ends of said body; the holding extensions at one end of said body being straight, widely separated and extending longitudinally with the body and the holding extensions at the opposite end of said body being of unequal length and curved inwardly toward each other to provide a contracted passageway for the line near one corner of said body and also retaining portions which extend across the winding path of the line; said contracted passageway being slightly wider than the diameter of the line to be wound on said reel, and a starting notch for the line cut in the body end in proximity to the juncture point of the longer curved extension with said body and diagonally opposite the contracted passageway.

In testimony that I claim the foregoing invention I have hereunto set my hand in the presence of two witnesses.

LUDOLF TOEGEL.

Witnesses:
 GEO. L. TOEGEL,
 D. H. HARPER.